Figure 1:
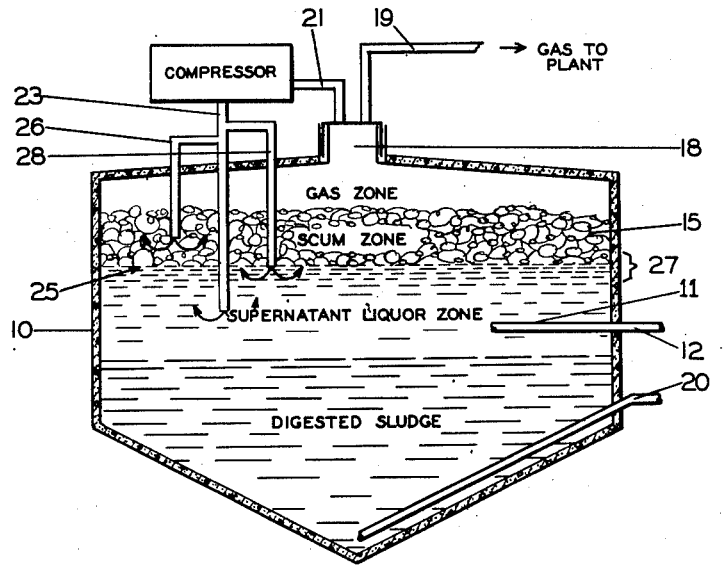

May 26, 1953 P. D. McNAMEE ET AL 2,640,027
SEWAGE SLUDGE DIGESTION PROCESS
Filed April 12, 1948

INVENTORS
PAUL D. McNAMEE
ALLAN B. FAY
THOMAS S. DERRY
BY
Fisher + Christen
ATTORNEYS Patented May 26, 1953

2,640,027

UNITED STATES PATENT OFFICE 2,640,027

SEWAGE SLUDGE DIGESTION PROCESS

Paul D. McNamee, Washington, D. C., Allan B. Fay, Montgomery County, Md., and Thomas S. Derry, Washington, D. C., assignors to Paul D. McNamee, Allan B. Fay, Thomas S. Derry, Ralph E. Fuhrman, John Rice, and Hugh Schreiber, all of Washington, D. C.; Ruth Koons McNamee, executrix of said Paul D. McNamee, deceased Application April 12, 1948, Serial No. 20,478

8 Claims. (Cl. 210—2)

This invention relates to the treatment of sewage and has particular relation to a method and apparatus for the removal of the floating scum layer in the digestion of sludge resulting from the treatment of sewage, industrial wastes, garbage, mixtures thereof and other organic matter.

In the control of the biological digestion of organic matter removed in the treatment of sewage, industrial wastes and garbage, or a mixture of these wastes, it is well known that sludge digestion is normally accompanied by the formation of a floating scum blanket or layer. Various methods and apparatus have been proposed to break up and prevent the formation of this scum layer. Most of the proposed systems which have actually been put into industrial practice are set forth in the text "Sewerage and Sewage Treatment" by Babbitt on page 587 of the 1947 edition.

The prior art also has proposed digestion tanks wherein the dome lid rests on the scum layer, keeping it submerged. The gas bubbles are described as being forced to travel along the inner dome surface to the dome center, where they are collected. It has been proposed that this action provides some agitation and degasification of the scum layer, causing the particles to settle. In another prior art proposal the digestion chamber is provided with a conical roof having stepped, downwardly projecting rings which rest on the scum layer. The gas generated in the annular spaces is described as bubbling from one ring up to the succeeding higher ring and it has been proposed that this system provides both some agitation and degasification. Both the aforementioned proposals are open to the objections, among others, that they are ineffectual and that degasification and agitation become progressively weaker from the center to the circumference of the tank. It also has been proposed to break up the scum layer by spraying it with supernatant liquor.

In this connection, the prior art also has proposed the treatment of the supernatant liquor layer by blowing air therein in order to float up the colloidal matter therein for surface removal. It also has been proposed to draw off and then aerate the supernatant liquor in a separate tank in order to settle the colloids in the separated supernatant liquor by degasification. Moreover, it also has been proposed to treat the supernatant liquor by drawing it off and elutriating it thereby causing the suspended solids to sink on the premise that the dilution degasifies the particles.

Structural mechanisms inside a tank are subject to failure from corrosion and other causes and require occasional repair. This necessitates removing part or all of the tank contents and may give rise to a gaseous explosive mixture in the tank. Circulating pumps for transferring the tank contents frequently become clogged by the trash in the scum, making this method troublesome. There have been numerous accidents in recent years from explosions at sewage plants where such work has been required and some of these have been fatal to workmen and have been accompanied by great structural damage.

The usual method of digesting these sludges is to allow them to remain in a tank for a considerable period during which time chemical and bacterial decomposition proceeds. Tanks are normally designed so that the digested sludge accumulates at the bottom. Above this is the supernatant liquor which is displaced as fresh material is added to the tank. Above the supernatant liquor and at the liquid surface of the tank is the floating scum layer, which, for effective operation, should not be permitted to compact and accumulate to the extent that it interferes with the displacement of liquid from the tank.

The supernatant liquor layer is also referred to as a supernatant liquor zone or as an intermediate zone. Thus, the intermediate zone in an active digester normally will consist of a zone of a lighter concentration of solids than in the scum zone immediately above and the digested sludge zone below.

Digestion is the usual method of sludge treatment. In most digesters scum formation is a serious problem. Its effective control is a current need in sewage treatment.

We have discovered that the floating scum layer may be removed in the digestion treatment of sewage sludge wherein the digested sludge normally settles to the bottom of the digester, supernatant liquor normally remains above the sludge layer and a scum layer normally forms and floats above the supernatant liquor layer, by injecting a gas below the top surface of the floating scum layer. We have discovered that this novel treatment causes the injected gas, rising upwardly, to agitate the scum layer, degasify the solid matter in the scum layer and permit it to settle to the sludge layer, and disintegrate the scum layer.

We have further discovered that the above-mentioned beneficial effects are obtainable by releasing the gas in the zone defined by the top surface of the scum layer and the area fairly adjacent the bottom surface of the sludge layer. Moreover, we have discovered that the gas may be injected directly into the floating scum layer, or it preferably may be injected directly into the supernatant liquor layer, or it may be injected directly into the sludge layer.

We have also discovered that the aforementioned treatment may be most advantageously, efficiently and safely accomplished by utilizing sludge gas and in particular by utilizing the sludge gas which normally forms and is collected in the digestion chamber or digester. To this end we have discovered that our novel treatment is most advantageously effected by withdrawing a portion of the sludge gas from the digester and injecting it under pressure below the top surface of the scum layer, thereby continually recirculating a portion of the sludge gas which is formed in the digester. We have discovered, that as a practical operating treatment, it has proved most advantageous to compress the sludge gas withdrawn from the digester and inject it under pressure into the zone beneath the floating scum layer.

Accordingly, an object of this invention is to break up and disintegrate the floating scum layer formed in the digestion treatment of sludge. Another object is to prevent the formation of a thick digester scum layer which normally forms and floats on the supernatant liquor layer. A further object of the invention is to recirculate the sewage or sludge gas from the top of the digester to the zone below the floating scum layer for maintaining a scum layer which is thin enough to permit efficient operation of the digester.

A still further object of the invention is to convert energy in the form of a produced sludge gas to energy in the form of a compressed gas which may be utilized to break up the floating scum layer formed in the digestion treatment of sewage. Still another object of the invention is to provide apparatus whereby the foregoing method may be readily accomplished.

Other objects of the present invention are the provision of a method and apparatus which will permit the prevention of the accumulation of scum layer to an undesirable depth without interruption to tank service, eliminate the danger to life and property inherent in existing methods of scum control, eliminate the wear and clogging of equipment by abrasives, rags, and other materials normal to sewage sludge, eliminate the use of moving parts inside the tank, and permit application to a tank of any size and shape with fixed or movable roof, with free liquid surface above, in contact with, or below the roof, with or without stirring or mixing mechanisms, with or without the use of digester heating means.

Still other objects of the present invention are to permit the reduction and elimination of scum layer formation by utilizing a compressed gas from any source, or by using air or other gas in the absence of a gas collecting system in certain sewage treatment plants, such as tanks which are not designed for gas collection; e. g., the well-known Imhoff tanks.

Figure 2:
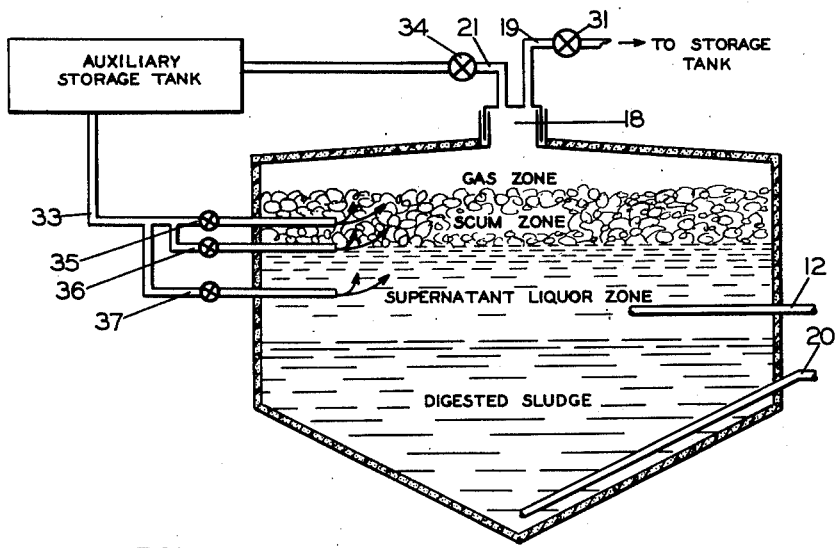

These and other objects of the invention will be readily apparent by reference to the following description and accompanying drawing, in which Fig. 1 is a diagrammatic view in vertical section of a digester embodying the method of the present invention in a preferred form, and Fig. 2 is a similar view of a further embodiment of the method and apparatus of the present invention.

Referring now to the drawing, there is shown a digester 10 into which raw solids 11 are introduced by means of the raw sludge inlet pipe 12 into the supernatant liquor zone. The digested sludge settles to the bottom of the digester because of its greater proportion of mineral matter, leaving the supernatant liquor layer above the digested sludge layer. During digestion, the entrainment of gas carries materials to the scum zone which lies above the supernatant liquor zone. The gas formed during the digestion is collected in the gas dome 18 and is released from the digester by means of the exhaust line 19, usually at relatively low pressure. A withdrawal pipe 20 for removing digested sludge from the bottom of the digester is normally provided, as in existing digestion sludge treatment apparatus.

In a preferred embodiment of the present invention, a portion of the released gas is withdrawn from the gas dome 18 by means of the gas line 21 leading to the compressor where the sludge gas is compressed and returned by means of the inlet gas line 23 under pressure back into the digester 10 and injected below the top of the scum layer. As shown, the gas may be injected directly into the scum layer zone, as by means of the injection gas inlet pipe 26; or it may be injected directly into the zone 27 defined by the juncture of the floating scum layer and the supernatant liquor layer, as by means of line 28; or it may be injected directly into the supernatant liquor layer, as by the extended injection line 23; or it may be injected directly into the digested sludge layer, as by means of an extension (not shown) of the injection lines 23, 26 or 28.

In a further embodiment of the invention as illustrated in Fig. 2, the released gases are withdrawn from the gas dome 18 by means of the gas line 21 to an auxiliary storage tank. It will be apparent that the released gas builds up a pressure in both the digester 10 and auxiliary storage tank so long as the valves 31, 35, 36 and 37 are closed. When the pressure of the gas in the digester and storage tank system reaches a predetermined pressure, a check valve 34 is held closed by back pressure and a suitable pressure valve 31 in the exhaust gas line 19 is opened thereby permitting the flow of excess gas from the digester into a gas storage tank or into the atmosphere. Upon this occurrence, the pressure in the digester is suddenly lowered and the pressure in the auxiliary storage tank is equalized with the pressure in the digester 10 by means of gas passing from the storage tank to the digester 10 through the gas line 33 and the control valves 35, 36 and 37. The released gas during this operation is prevented from being passed back into the gas line 21 by means of the check valve 34. It will be apparent that the injecting gas system emanating from the gas line 33 may include various types of gas injectors which are positioned below the top surface of the scum layer. The cycle just mentioned may be repeated at intervals depending upon the gas production of the digesting sludge. It will also be apparent that additional auxiliary storage tank systems may be provided in order to permit continual gas storage and injection operation, which may be accomplished automatically without the necessity of utilizing mechanical compression of the gas, thereby providing a self-operating unit. This embodiment of the invention is not presently considered to be entirely satisfactory inasmuch as the amount of gas released has not been found sufficient to entirely eliminate the scum cap and the volume of gas required in the auxiliary storage tank has been calculated by us to be too great to permit utilization in large-scale plant operation. However, this embodiment is recommended as satisfactory for small digester installations, such as those employed by industry and by small towns.

In an actual plant operation, the preferred embodiment of the present invention has found successful use with digester tanks having a surface area of 5,500 square feet and wherein, under average operation, the digester normally contains a dense scum layer approximately 8 feet in depth. In applying the present invention as shown in Fig. 1, a compressor having a rating of 45 cubic feet per minute was connected to the exhaust sludge gas line of the tank and arranged to withdraw a portion of the exhaust sludge gas, compress it and discharge it through an injection pipe of 1½ inch diameter inserted through an opening in the tank roof, the discharge end terminating in about the center zone of the supernatant liquor layer. In one actual reduction to practice, the compressor was operated for 8 hours per day for a period of about one month. It was found by analysis that the samples removed from the scum zone were much thinner than before the present invention was employed. Several truck loads of trash had to be moved from the screens (not shown) at the elutriation unit (not shown), indicating that this material had been displaced from the scum zone. These results were considered effective but not to the extent that it was considered that the best possible results would be obtained by virtue of this form of the present invention.

In a further use of the present invention, the operation was made continuous in a similar manner for a period of 13 days. At the end of that time, the scum layer, which was about 6 feet in depth at the beginning of the operation, had entirely disappeared, only a thin layer of seeds being observed to remain in place of the normal scum layer. It was found that the bottom sludge in the digester was so full of trash that it was somewhat difficult to withdraw. The alkalinity of the top water, or supernatant liquor, in the digester went up approximately 800 p. p. m. during the operation, thus indicating that the dense scum, with a higher alkalinity than that of the top water, had been distributed throughout the digester.

We have also discovered that with one gas injector for every 1,000 square feet of the digester area, the time required to remove a scum layer is greatly reduced. Visual observations indicate that, within five minutes' time, an area of approximately 100 square feet is free of scum and this area increases progressively slower as the area itself increases in size.

We have further discovered that the effectiveness of a single gas injection increases progressively as the injector outlet is lowered from the scum zone, thence to the supernatant liquor zone, and thence to the digesting sludge zone. It appears that the horizontal area of gas dispersion is thereby increased and that more violent vibration and agitation take place than when the gas is injected directly into the scum zone or into the supernatant liquor zone. Moreover, it appears that the dispersion of the supernatant liquor in the scum layer assists in the disintegration process. However, we do not desire to be confined to the above-recited theories, inasmuch as the digestion treatment of sewage involves numerous complexities and indeterminate physical and chemical conditions. In any event, we have set forth a full teaching and disclosure which will enable those skilled in the art to successfully practice our invention.

We have also found that it is possible to practice the present invention by using air under pressure in place of the sludge gas. However, the use of air in a closed digester system is entirely unnecessary and moreover creates an explosive hazard.

It will be appreciated that the method and apparatus of the present invention are not confined to the treatment of sewage or garbage or the like, inasmuch as other organic materials of a similar nature likewise may be treated.

It will also be apparent that a plurality of injecting gas dispensers may be distributed throughout the digester and that the gas injectors may be designed in a variety of forms and stationed in a variety of positions. Thus, the gas injectors may take the form of one or more types placed parallel to the scum zone and having one or more perforations along the injector line. Likewise, the gas injectors may be positioned vertically to the scum zone and may be provided along the line with one or more perforations or with horizontally extending injection lines which disseminate the gas throughout the desired area.

While the present invention has been described particularly with reference to the foregoing embodiments thereof, it will be understood that various modifications may be employed within the spirit of the invention and within the scope of the invention as defined in the appended claims.

We claim:

1. In a digestion treatment of sewage sludge wherein digested sludge normally settles to the bottom of the digester, supernatant liquor normally remains above the sludge layer and a scum layer normally forms and floats above the supernatant liquor layer, the method of removing the floating scum layer which comprises injecting a sludge gas under pressure under said scum layer and into the supernatant liquor layer to agitate said liquor layer and thereby agitate and vibrate said scum layer and disperse a portion of said liquor layer upwardly into said scum layer and degasify the said scum layer to disintegrate same and settle the solid matter therefrom.

2. In the digestion treatment of sewage sludge wherein digested sludge normally settles to the bottom of the digester, supernatant liquor normally remains above the sludge layer, a scum layer normally forms and floats above the supernatant liquor layer and sludge gas normally forms in the digester, the method of removing the floating scum layer which comprises withdrawing at least a portion of said sludge gas from the digester and injecting said portion of the sludge gas under pressure under said scum layer and into the supernatant liquor layer to agitate said liquor layer and thereby agitate and vibrate said scum layer and disperse a portion of said liquor layer upwardly into said scum layer and degasify the said scum layer to disintegrate same and settle the solid matter therefrom.

3. In the digestion treatment of sewage sludge wherein digested sludge normally settles to the bottom of the digester, supernatant liquor normally remains above the sludge layer, a scum layer normally forms and floats above the supernatant liquor layer and sludge gas normally forms in the digester, the method of removing the floating scum layer, which comprises withdrawing at least a portion of said sludge gas, mechanically compressing said portion of the sludge gas and injecting said sludge gas under pressure under said scum layer and into the supernatant liquor layer to agitate said liquor layer and thereby agitate and vibrate said scum layer and disperse a portion of said liquor layer upwardly into said scum layer and degasify the said scum layer to disintegrate same and settle the solid matter therefrom.

4. In the digestion treatment of sewage sludge wherein digested sludge normally settles to the bottom of the digester, an intermediate zone, including supernatant liquor, normally remains above the sludge layer and a scum layer normally forms and floats above the supernatant liquor of the intermediate zone, the method of removing the floating scum layer which comprises compressing a sludge gas, injecting said compressed sludge gas under pressure under said scum layer and directly into the intermediate zone to disperse said gas and to agitate the liquor in a free and unconfined manner across said intermediate zone and thereby agitate and vibrate said scum layer and degasify the said scum layer to disintegrate same and settle the solid matter therefrom.

5. In the digestion treatment of sewage sludge wherein digested sludge normally settles to the bottom of the digester, an intermediate zone, including supernatant liquor, normally remains above the sludge layer and a scum layer normally forms and floats above the supernatant liquor of the intermediate zone, the method of removing the floating scum layer which comprises compressing a sludge gas, injecting said compressed sludge gas under pressure under said scum layer and directly into the intermediate zone simultaneously at a plurality of points to disperse said gas and to agitate the liquor in a free and unconfined manner across said intermediate zone and thereby agitate and vibrate said scum layer and degasify the said scum layer to disintegrate same and settle the solid matter therefrom.

6. In the digestion treatment of sewage sludge wherein digested sludge normally settles to the bottom of the digester, an intermediate zone, including supernatant liquor, normally remains above the sludge layer and a scum layer normally forms and floats above the supernatant liquor of the intermediate zone, the method of removing the floating scum layer which comprises compressing a sludge gas, continuously injecting said compressed sludge gas under pressure under said scum layer and directly into the intermediate zone to disperse said gas and to agitate the liquor in a free and unconfined manner across said intermediate zone and thereby agitate and vibrate said scum layer and degasify the said scum layer to disintegrate same and settle the solid matter therefrom.

7. In the digestion treatment of sewage sludge wherein digested sludge normally settles to the bottom of the digester, an intermediate zone, including supernatant liquor, normally remains above the sludge layer, a scum layer normally forms and floats above the supernatant liquor in the intermediate zone, and a sludge gas zone is normally formed above the scum layer, the method of removing the floating scum layer which comprises withdrawing sludge gas from said sludge gas zone, compressing said sludge gas, and injecting said sludge gas under said scum layer and directly into the intermediate zone at a plurality of points simultaneously to disperse said gas and to agitate the liquor in a free and unconfined manner in said intermediate zone and under sufficient pressure to cause said sludge gas to so disperse therein as to thereby agitate and vibrate said scum layer and degasify the said scum layer to disintegrate same and settle the solid matter therefrom.

8. In the digestion treatment of sewage sludge wherein digested sludge normally settles to the bottom of the digester, an intermediate zone, including supernatant liquor, normally remains above the sludge layer, a scum layer normally forms and floats above the supernatant liquor in the intermediate zone, and a sludge gas zone is normally formed above the scum layer, the method of removing the floating scum layer which comprises withdrawing sludge gas from the sludge gas zone, compressing said sludge gas, and continuously injecting said sludge gas under said scum layer and directly into the intermediate zone at a plurality of points simultaneously to disperse said gas and to agitate the liquor in a free and unconfined manner in said intermediate zone and under sufficient pressure to cause said sludge gas to so disperse therein as to thereby agitate and vibrate said scum layer and degasify the said scum layer to disintegrate same and settle the solid matter therefrom.

PAUL D. McNAMEE.
ALLAN B. FAY.
THOMAS S. DERRY.

References Cited in the file of this patent

UNITED STATES PATENTS

| Number | Name | Date |
|---|---|---|
| 1,690,682 | Imhoff et al. | Nov. 6, 1928 |
| 1,806,693 | Miller | May 26, 1931 |
| 1,838,475 | Buswell | Dec. 29, 1931 |
| 2,029,702 | Buswell et al. | Feb. 4, 1936 |
| 2,097,454 | Fischer | Nov. 2, 1937 |
| 2,297,195 | Behringer | Sept. 29, 1942 |
| 2,422,394 | Carter | June 17, 1947 |

FOREIGN PATENTS

| Number | Country | Date |
|---|---|---|
| 401,052 | Germany | Aug. 25, 1924 |
| 441,851 | Germany | Mar. 16, 1927 |
| 492,809 | Germany | Mar. 1, 1930 |